(12) United States Patent
Kobayashi (10) Patent No.: US 10,109,314 B1
(45) Date of Patent: Oct. 23, 2018

(54) STORAGE DEVICE AND CONTROL METHOD

(71) Applicants:Kabushiki Kaisha Toshiba, Minato-kum Tokyo (JP); Toshiba Electronic Devices & Storage Corporation, Minato-ku, Tokyo (JP)

(72) Inventor: Manabu Kobayashi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/914,070

(22) Filed: Mar. 7, 2018

(30) Foreign Application Priority Data

Sep. 14, 2017 (JP) ................................. 2017-176962

(51) Int. Cl.
*G11B 5/09* (2006.01)
*G11B 27/36* (2006.01)
*G11B 20/18* (2006.01)

(52) U.S. Cl.
CPC ............ *G11B 20/1833* (2013.01); *G11B 5/09* (2013.01); *G11B 2020/185* (2013.01); *G11B 2020/1863* (2013.01)

(58) Field of Classification Search
CPC ............ G11B 5/012; G11B 27/36; G11B 5/02; G11B 5/59655; G11B 20/10009; G11B 20/1426; G11B 5/09; G11B 20/0212; G11B 20/18
USPC .......................... 360/25, 29, 31, 40, 45, 53
See application file for complete search history.

(56) References Cited

U.S. PATENT DOCUMENTS

| 8,379,339 B2* | 2/2013 | Parthasarathy .......... G11B 5/09 360/39 |
| 8,976,475 B1 | 3/2015 | Li et al. |
| 2010/0123969 A1 | 5/2010 | Urata |

FOREIGN PATENT DOCUMENTS

JP     2002-184112 A     6/2002

* cited by examiner

*Primary Examiner* — Nabil Hindi
(74) *Attorney, Agent, or Firm* — White & Case LLP (57) ABSTRACT

According to one embodiment, a storage device includes a detector, a demodulator, a controller, and a recorder. When a user data item is split data including first data being at least part of a first code word and second data being at least part of a second code word, the controller sets a start position of the second data for forced search of the second code word on the basis of the position of a sync mark recorded in the recorder when the forced search of the first code word has succeeded.

20 Claims, 11 Drawing Sheets

RELATIONSHIP

| SYNC MARK | CODE WORD |
|---|---|
| 1ST SM | CW0 |
| 2ND SM | CW0, CW1 |
| 3RD SM | CW1 |
| ⋮ | ⋮ |

STORAGE DEVICE AND CONTROL METHOD

CROSS-REFERENCE TO RELATED APPLICATIONS

This application is based upon and claims the benefit of priority from Japanese Patent Application No. 2017-176962, filed Sep. 14, 2017, the entire contents of which are incorporated herein by reference.

FIELD

Embodiments described herein relate generally to a storage device and a control method.

BACKGROUND

Electronic apparatuses such as a computer or a video recorder typically use a magnetic disk device as a storage device. Magnetic disk devices include a magnetic disk that magnetically stores information, a magnetic head that performs data read and write from and onto the magnetic disk, and a control circuit.

Such a magnetic disk includes multiple concentric tracks each of which is partitioned into sectors. The magnetic head relatively moves on the tracks as the magnetic disk rotates, reading or writing data from and onto intended sectors. Data to be recorded on each sector of the magnetic disk includes a preamble, a sync mark, and user data in this order from the beginning. Each sector stores one or more data items having such configuration.

The preamble is data to be a reference for synchronous clock with which to read data. The sync mark is an identifier for finding the beginning of user data. The control circuit of the magnetic disk device synchronizes a read clock with a preamble read by the magnetic head to read a sync mark, and then controls the magnetic head to read user data following the sync mark. The user data is demodulated in units of code word.

To deal with sync mark errors (failures in reading sync marks) because of scratches or the like on the magnetic disk, there is a technique for recovering user data unread due to a sync mark error by a forced search. In the forced search, signal sampled values of a sector to read having a sync mark error are held in a buffer, and the buffered data is demodulated while being shifted. A successful demodulation means that the user data has been successfully read. Whether the demodulation is successful or unsuccessful is determined by parity check, for example.

However, such a conventional technique may require a long processing time for the recovery of user data, if the user data corresponding to an unread sync mark spans multiple code words, since all of the multiple code words are enforcedly searched. Thus, improvement of the technique is desired.

DETAILED DESCRIPTION

According to one embodiment, a storage device includes a detector, a demodulator, a controller, and a recorder. The detector unit detects a sync mark, assigned to each of user data items, from buffered data read from a recording medium. The demodulator demodulates the user data items of the buffered data in unit of code word having a given size. The controller sets a start position of data of interest for forced search, the data of interest being part of each user data item of the buffered data, starting from the start position. When a user data item is split data including first data being at least part of a first code word and second data being at least part of a second code word, and when the detector has not detected the sync mark corresponding to the user data item, the controller controls, in the forced search of the user data item, the demodulator to demodulate the first code word such that the data of interest of the first data is repeatedly demodulated until successfully demodulated while the start position is shifted. The recorder records a position of the sync mark when the controller has succeeded in the forced search. The controller sets the start position of the second data for the forced search of the second code word on the basis of the position of the sync mark recorded by the recorder when the controller has succeeded in the forced search of the first code word.

First to third embodiments of a magnetic disk device (storage device) of the present invention will be described below with reference to the accompanying drawings. The second and third embodiments will omit overlapping descriptions with those in their preceding embodiments when appropriate. These embodiments are presented for illustrative purpose only and not intended to limit the scope of the present invention.

For the sake of better understanding, a comparative example (conventional technique) will be described first. Hereinafter, a preamble may be denoted as "PRE"; a sync mark may be as "SM"; user data may be as "DATA"; a code word may be as "CW"; and servo information (described later) may be as "SV".

Comparative Example

Figure 8:
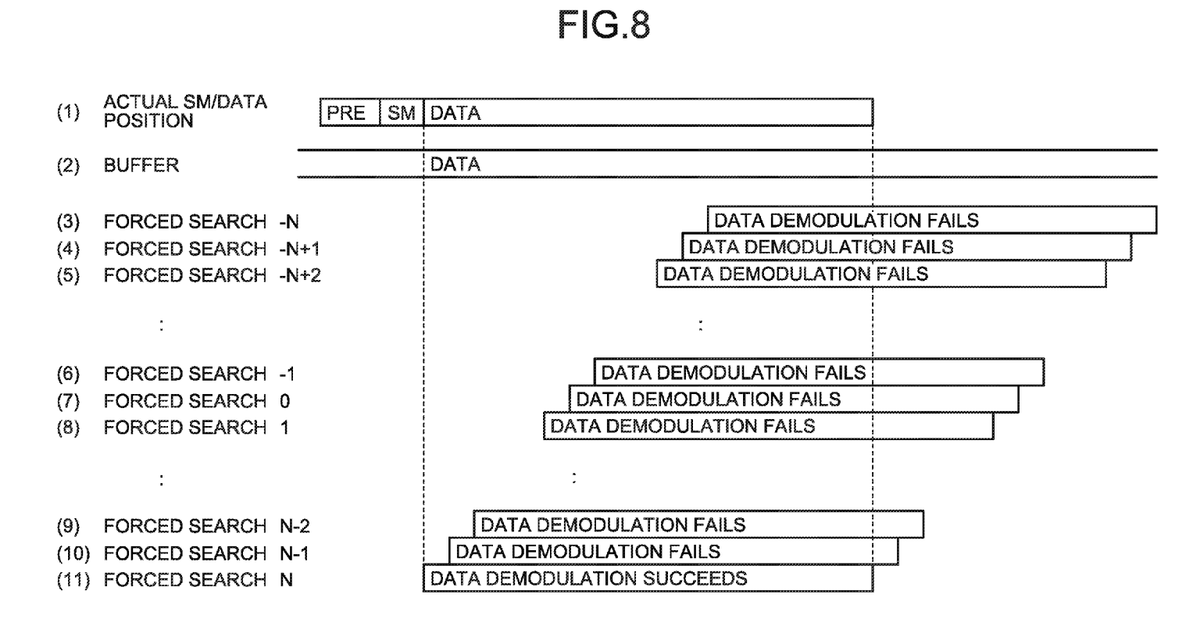
FIG. 8 is an explanatory diagram of a forced search in a comparative example.

FIG. 8 is an explanatory diagram of a forced search in the comparative example. It is assumed that the actual positions of PRE, SM, and DATA recorded on a magnetic disk are as indicated in the item (1). The item (2) shows the data read into a buffer (hereinafter also called "buffered data"). If detection of the SM of the data fails, demodulation of the data is attempted at the position indicated in the item (3) but ends up in failure.

Then, the position of the data to demodulate is shifted, and the demodulation of the data is attempted at the position indicated in the item (4) but ends up in failure. Such demodulation is repeated at the positions indicated in the items (5) to (11) and succeeds at the position indicated in the item (11).

Thus, a large number of attempts while shifting buffered data (a signal sample series) elongates the processing time for the forced search, which creates demands for reducing the number of demodulations as small as possible.

Figure 9:
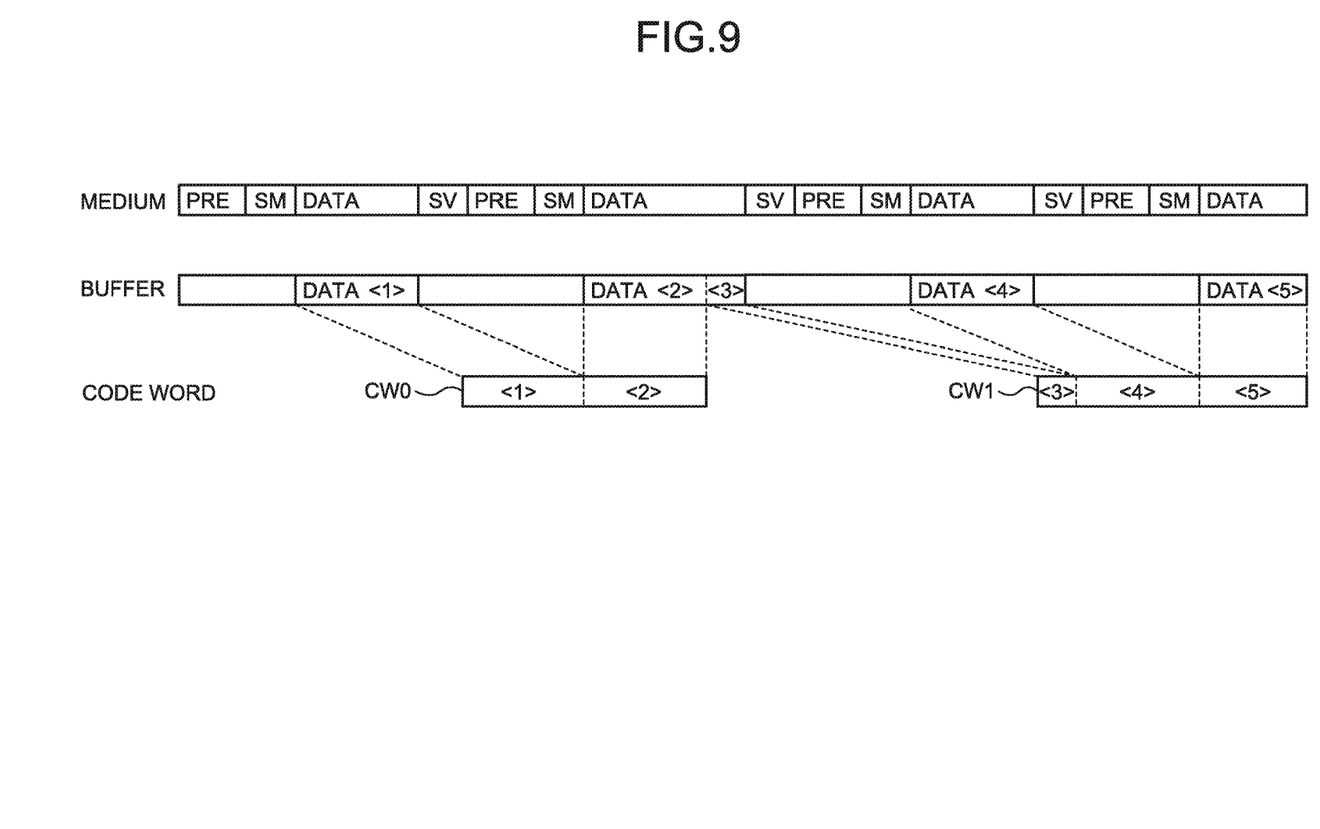
FIG. 9 is a diagram illustrating an exemplary relationship between user data and code words.

Next, FIG. 9 is a diagram illustrating an exemplary relationship between user data and code words. Servo information SV in addition to PRE, SM, and DATA are recorded on a medium, or a magnetic disk. The SV is used for positioning-control of the magnetic head. Data in a sector is divided by the SV, creating multiple SMs per sector.

The SM is a code for finding the beginning of user data at the time of reproduction. No detection of an SM signifies that user data is unreproducible. Thus, in order to be able to identify SMs with about several bit error, SMs are determined to be OK when matching of a preset number or more of bits is detected.

The DATA (user data) is data sent from a host computer, and is data of 512 bytes, 4,096 bytes, or greater. In addition to the above, data recorded on the medium may include, for example, an error correcting code such as ECC data and a postamble to finish maximum likelihood (ML) decision on partial response maximum likelihood (PRML), although illustration and further description thereof are omitted.

In the example of FIG. 9, CW0 consists of DATA<1> and DATA<2>. CW1 consists of DATA<3>, DATA<4>, and DATA<5>.

User data is demodulated on a code-word basis. Data of one sector is divided into two or more CWs. The larger the size of data to demodulate, the larger the size of the demodulating circuit, which may impose a constraint on the circuit scale of a read channel, resulting in an increase in power consumption. Thus, demodulation in units of code word having an appropriate size will be able to avoid these problems.

From the above, it is found that forced search time for each sector depends on the number of code words in the sector in question, the number of sync marks in each code word, and the number of times at which buffered data (signal sample series) is shifted.

Figure 10:
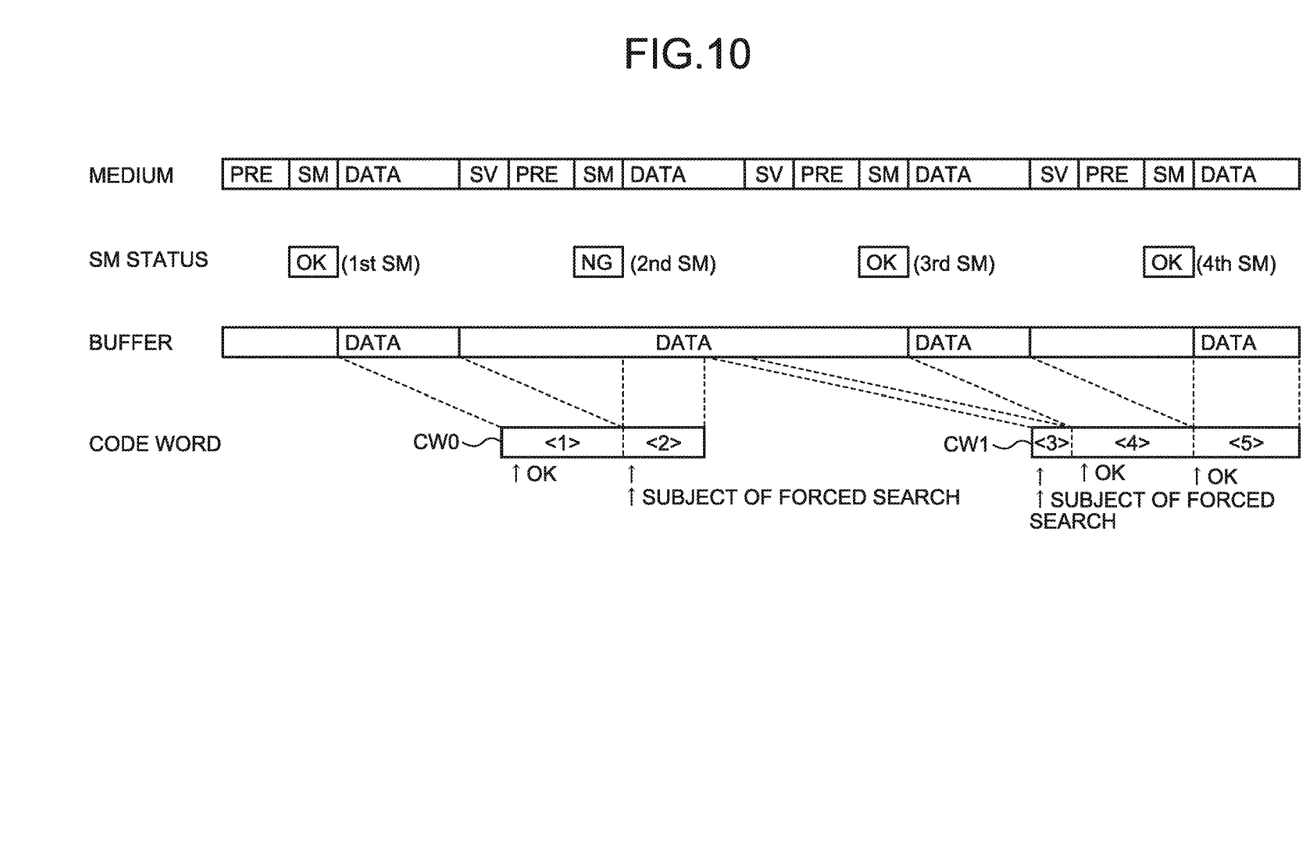
FIG. 10 is an explanatory diagram of an exemplary sync mark error in the example of FIG. 9.

FIG. 10 is an explanatory diagram of a sync mark error in the example of FIG. 9. In the example of FIG. 10, a sync mark error occurs in split data (user data consisting of DATA<2> and DATA<3>) corresponding to the 2nd SM. In this case, an independent forced search is necessary for both CW0 and CW1. As a comparative example, such a forced search will be described with reference to FIG. 11.

Figure 11:
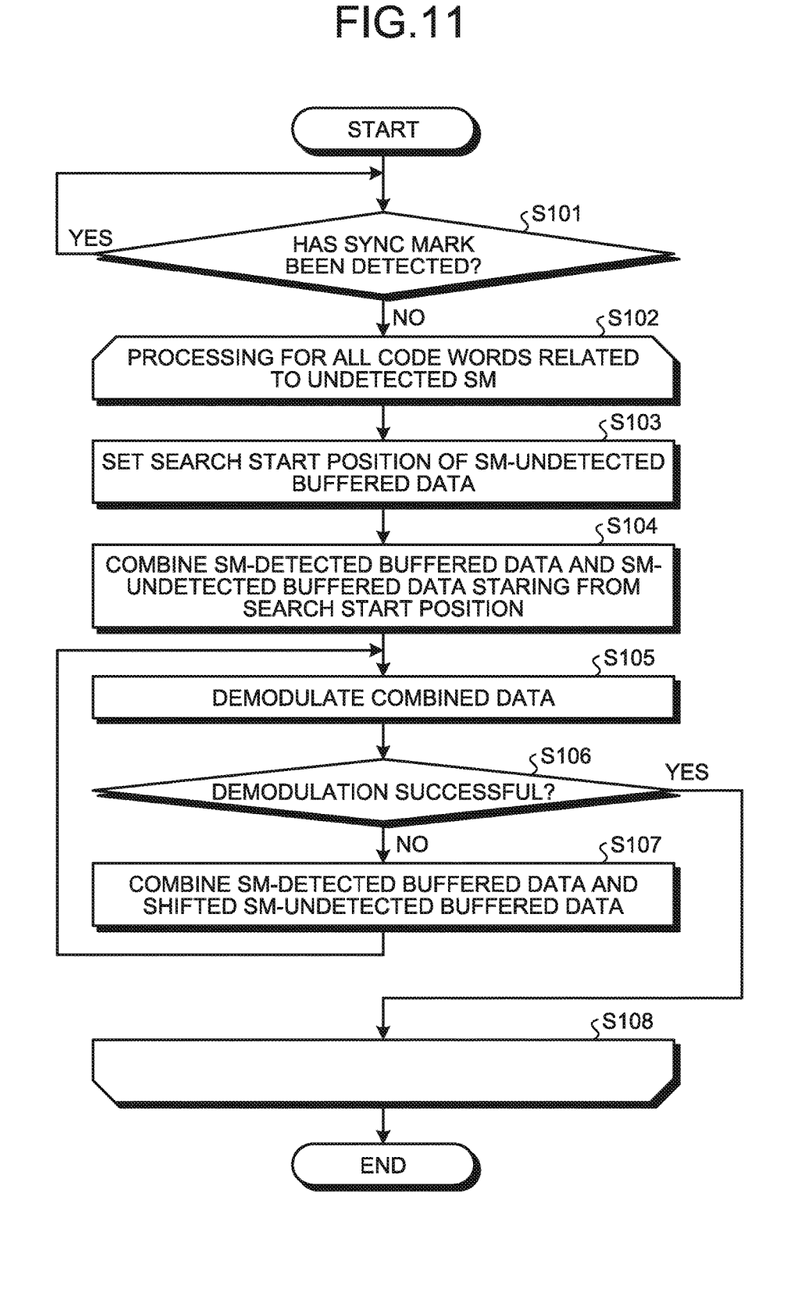
FIG. 11 is a flowchart illustrating the process in the comparative example.

FIG. 11 is a flowchart illustrating the process in the comparative example. First, at step S101, whether a sync mark has been detected is determined. If YES, the process returns to step S101, and if NO, the process proceeds to step S102. The 2nd SM in FIG. 10 having an error cannot be detected so that step S101 results in NO.

In steps S103 to S107 among steps S102 to S108, all the code words (CW0 and CW1) related to the undetected SM (the 2nd SM) are subjected to the process.

At step S103, a search start position of SM-undetected buffered data is set by a conventional method. A search range may also be set.

At step S104, SM-detected buffered data and the SM-undetected buffered data starting from the search start position are combined together. In CW0, the SM-detected buffered data is DATA<1>, and the SM-undetected buffered data is DATA<2>. In CW1, the SM-detected buffered data is DATA<4> and DATA<5>, and the SM-undetected buffered data is DATA<3>.

At step S105, the combined data is demodulated. At step S106, success or failure of the demodulation is determined. If YES, step S107 is skipped, and if NO, the process proceeds to step S107.

At step S107, the SM-detected buffered data and shifted SM-undetected buffered data are combined together, and the process returns to step S105.

As such, in the comparative example of FIG. 10, both CW0 and CW1 need to be independently subjected to the processing in steps S103 to S107 of FIG. 11, which may elongate the processing time.

First Embodiment

Figure 1:
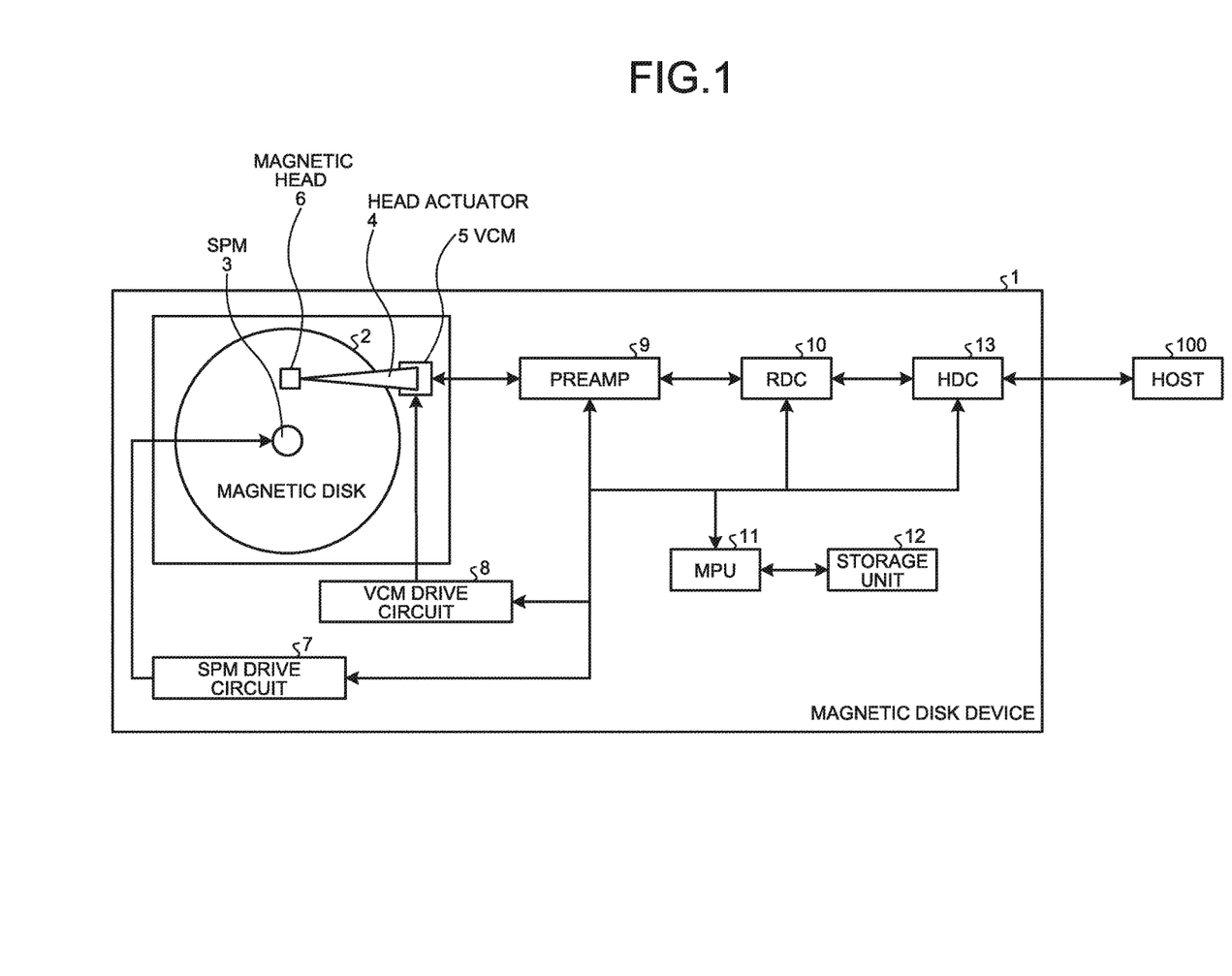
FIG. 1 is a diagram of the overall configuration of a magnetic disk device of a first embodiment.

Next, a first embodiment of the present invention will be described. FIG. 1 is a diagram of the overall configuration of a magnetic disk device 1 of the first embodiment. As shown in FIG. 1, the magnetic disk device 1 includes a magnetic disk 2, a spindle motor (SPM) 3, a head actuator 4, a voice coil motor (VCM) 5, a magnetic head 6, an SPM drive circuit 7, a VCM drive circuit 8, a preamp 9, a read channel (RDC) 10, a micro-processing unit (MPU) 11, a storage unit 12, and a hard disk controller (HDC) 13. A host 100 (a host computer) is, for example, a computer device such as a server which issues commands to cause the magnetic disk device 1 to perform desired operations.

The magnetic disk device 1 is a storage device in the computer device. The magnetic disk 2 is a recording medium made of magnetic films on a disk-shaped body such as an aluminum or glass substrate.

The SPM 3 is a means for rotating the magnetic disk 2. The head actuator 4 is an arm to support the magnetic head 6 on its tip.

The VCM 5 is a means for driving the head actuator 4. The magnetic head 6 is a means for data read and write from and onto the magnetic disk 2.

The SPM drive circuit 7 is a means for rotating the SPM 3. The VCM drive circuit 8 is a means for driving the VCM 5.

The preamp 9 is an amplifier that amplifies signals read or written by the magnetic head 6 from or onto the magnetic disk 2. The RDC 10 is a means for encoding data to be written onto the magnetic disk 2 and decoding a signal read from the magnetic disk 2.

The MPU 11 is a means for controlling the operations of all the devices in the magnetic disk device 1. The storage unit 12 is a rewritable storage medium (e.g., a memory) that stores programs and data. The HDC 13 controls data transmission and reception between the magnetic disk device 1 and the host 100.

Figure 2:
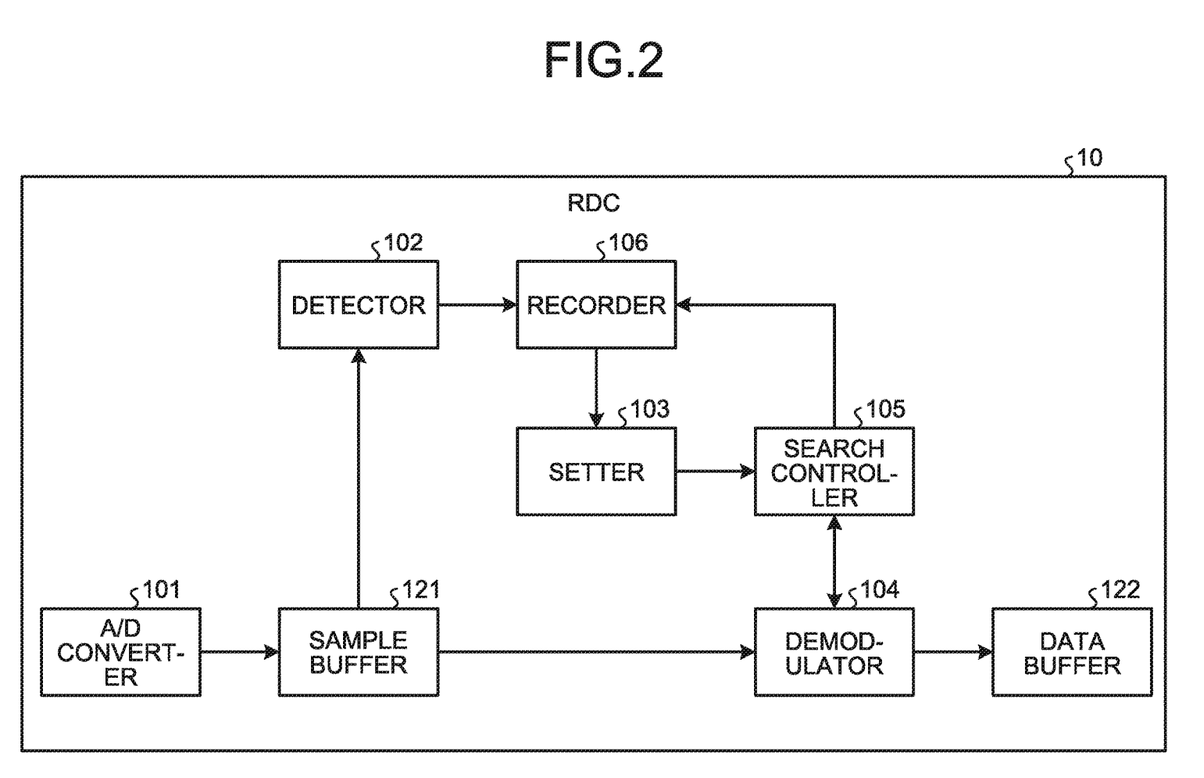
FIG. 2 is a functional configuration diagram of an RDC in the magnetic disk device of the first embodiment.

Next, the functional configuration of the RDC 10 in the magnetic disk device 1 will be described with reference to FIG. 2. FIG. 2 is a functional configuration diagram of the RDC 10 in the magnetic disk device 1 of the first embodiment. In FIG. 2, the main flow of information is indicated by arrows, however, information transfers may occur differently from the flow.

The RDC 10 includes an analog-to-digital (A/D) converter 101, a detector 102, a setter 103 (a controller), a demodulator 104, a search controller 105 (a controller), a recorder 106, a sample buffer 121, and a data buffer 122. The RDC 10 further includes, e.g., an FIR filter waveform equalizer that converts (equalizes the waveform of) a reproduced signal from the magnetic head 6 in accordance with a PR characteristic in use, although illustration and description thereof are omitted. The setter 103 and the search controller 105 can be implemented by a central processing unit (CPU) executing a certain program, but are not limited thereto. They may be implemented by hardware.

The A/D converter 101 A/D-converts a reproduced signal outputted from the preamp 9 and stores the A/D-converted signal into the sample buffer 121.

The detector 102 detects sync marks assigned to respective items of user data from the signal (buffered data) stored in the sample buffer 121.

The setter 103 sets a search start position of data of interest for forced search (described in detail later).

The demodulator 104 demodulates the user data out of the buffered data in unit of code word having a given size. The demodulator 104 includes, for example, a maximum likelihood decoder (Viterbi decoder), a low-density parity-check (LDPC) decoder, and a run-length-limited (RLL) decoder, of which illustration and description are omitted.

The search controller 105 performs a forced search from the search start position set by the setter 103. Herein, user data (DATA corresponding to the 2nd SM of FIG. 10 (hereinafter "of FIG. 10" is omitted as needed)) is assumed to be split data containing first data (DATA<2>) being at least part of the first code word (CW0) and second data (DATA<3>) being at least part of the second code word (CW1).

In this case, when the detector 102 has not detected the sync mark (2nd SM) corresponding to the user data (DATA corresponding to the 2nd SM), the search controller 105 controls the demodulator 104 to demodulate the first code word (CW0) in the forced search such that the demodulator 104 repeatedly demodulates the first data (DATA<2>) while shifting the search start position until the demodulation succeeds, using data starting from the search start position set by the setter 103 among buffered data stored in the sample buffer 121. The search controller 105 stores the successfully demodulated data into the data buffer 122.

The recorder 106 records the positions of sync marks detected by the detector 102. Further, the recorder 106 records the position of the sync mark obtained through the successful forced search by the search controller 105.

The setter 103 sets a search start position of the second data (DATA<3>) for a forced search for the second code word (CW1) on the basis of the position of the sync mark (the 2nd SM) recorded by the recorder 106 when the search controller 105 has succeeded in the forced search for the first code word (CW0).

The setter 103 may set the forced-search start position of data of interest on the basis of positional information on another sync mark detected by the detector 102.

Figure 3:
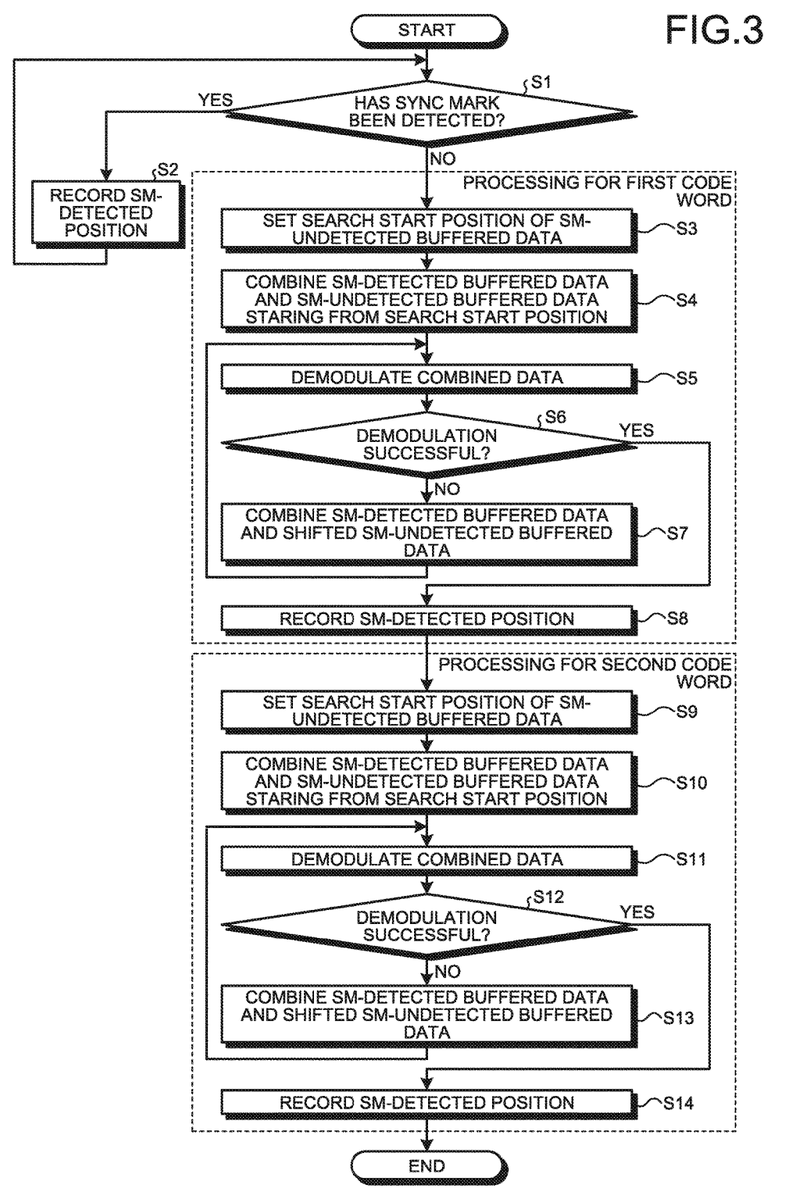
FIG. 3 is a flowchart illustrating the process by the magnetic disk device of the first embodiment.

Next, the process by the magnetic disk device 1 will be described with reference to FIG. 3. FIG. 3 is a flowchart illustrating the process by the magnetic disk device 1 of the first embodiment. In the process below, the demodulator 104 operates according to instructions from the search controller 105. Description will be made of an example where the user data (DATA) corresponding to the 2nd SM of FIG. 10 is subjected to the processing. As mentioned above, the user data (DATA) is split data that contains the first data (DATA<2>) being part of the first code word (CW0) and the second data (DATA<3>) being part of the second code word (CW1). Steps S3 to S8 concern processing for the first code word (CW0), and steps S9 to S14 concern processing for the second code word (CW1).

At step S1, the detector 102 determines whether a sync mark has been detected. If YES, the process proceeds to step S2, and if NO, the process proceeds to step S3.

At step S2, the recorder 106 records the position (SM-detected position) of the sync mark detected by the detector 102, and the process returns to step S1.

At step S3, the setter 103 sets a search start position of SM-undetected buffered data based on another SM-detected position. A search range may also be set. Without other SM-detected positions available, the setter 103 sets the search start position of the SM-undetected buffered data by a predetermined known algorithm.

At step S4, the demodulator 104 combines SM-detected buffered data (DATA<1>) and SM-undetected buffered data starting from the search start position (candidate data for DATA<2>).

At step S5, the demodulator 104 demodulates the combined data. At step S6, the demodulator 104 determines whether the demodulation has succeeded. If YES, the process proceeds to step S8, and if NO, the process proceeds to step S7.

At step S7, the demodulator 104 combines the SM-detected buffered data (DATA<1>) and shifted SM-undetected buffered data (candidate data for DATA<2>) together, and the process returns to step S5.

At step S8, the recorder 106 records the position of the sync mark (the position of the 2nd SM) when the demodulation by the forced search has succeeded. This completes the processing to the first code word (CW0). Then, the processing to the second code word (CW1) starts.

At step S9, the setter 103 sets a search start position of the second data (DATA<3>) for the forced search of the second code word (CW1) on the basis of the position of the sync mark (the 2nd SM) recorded by the recorder 106 when the forced search of the first code word (CW0) has succeeded. A search range may also be set. If the search start position has been already set based on other SM-detected positions before step S9, the setting is updated at step S9.

At step S10, the demodulator 104 combines SM-detected buffered data (DATA<4> <5>) and SM-undetected buffered data starting from the search start position (candidate data for DATA<3>).

At step S11, the demodulator 104 demodulates the combined data. At step S12, the demodulator 104 determines whether the demodulation has succeeded. If YES, the process proceeds to step S14, and if NO, the process proceeds to step S13.

At step S13, the demodulator 104 combines the SM-detected buffered data (DATA<4> <5>) and shifted SM-undetected buffered data (candidate data for DATA<3>), and the process returns to step S11.

At step S14, the recorder 106 records the position of the sync mark (the position of the 2nd SM) when the demodulation has succeeded through the forced search, completing the process.

Thus, upon non-detection of the sync mark corresponding to the user data (DATA corresponding to the 2nd SM) that spans the first code word (CW0) and the second code word (CW1), the magnetic disk device 1 of the first embodiment determines the forced-search start position of the second code word (CW1) based on the position of the sync mark (the 2nd SM) determined by the forced search of the first code word (CW0). This can greatly reduce the number of forced searches and shorten the processing time accordingly.

The magnetic disk device 1 of the first embodiment can set or update the forced-search start position of data of interest based on positional information on another sync mark detected by the detector 102. This can reduce the number of times at which data of interest is shifted during the forced search and shorten the processing time accordingly, as compared with no use of the positional information on another detected sync mark.

Second Embodiment

Next, a second embodiment of the present invention will be described. This second embodiment is based on the premise that the magnetic head 6 of FIG. 1 includes multiple, e.g., two readers, a first reader 61 and a second reader 62. The first reader 61 and the second reader 62 are provided for the purpose of improving data read accuracy from the magnetic disk 2, and both read the same data.

Figure 4:
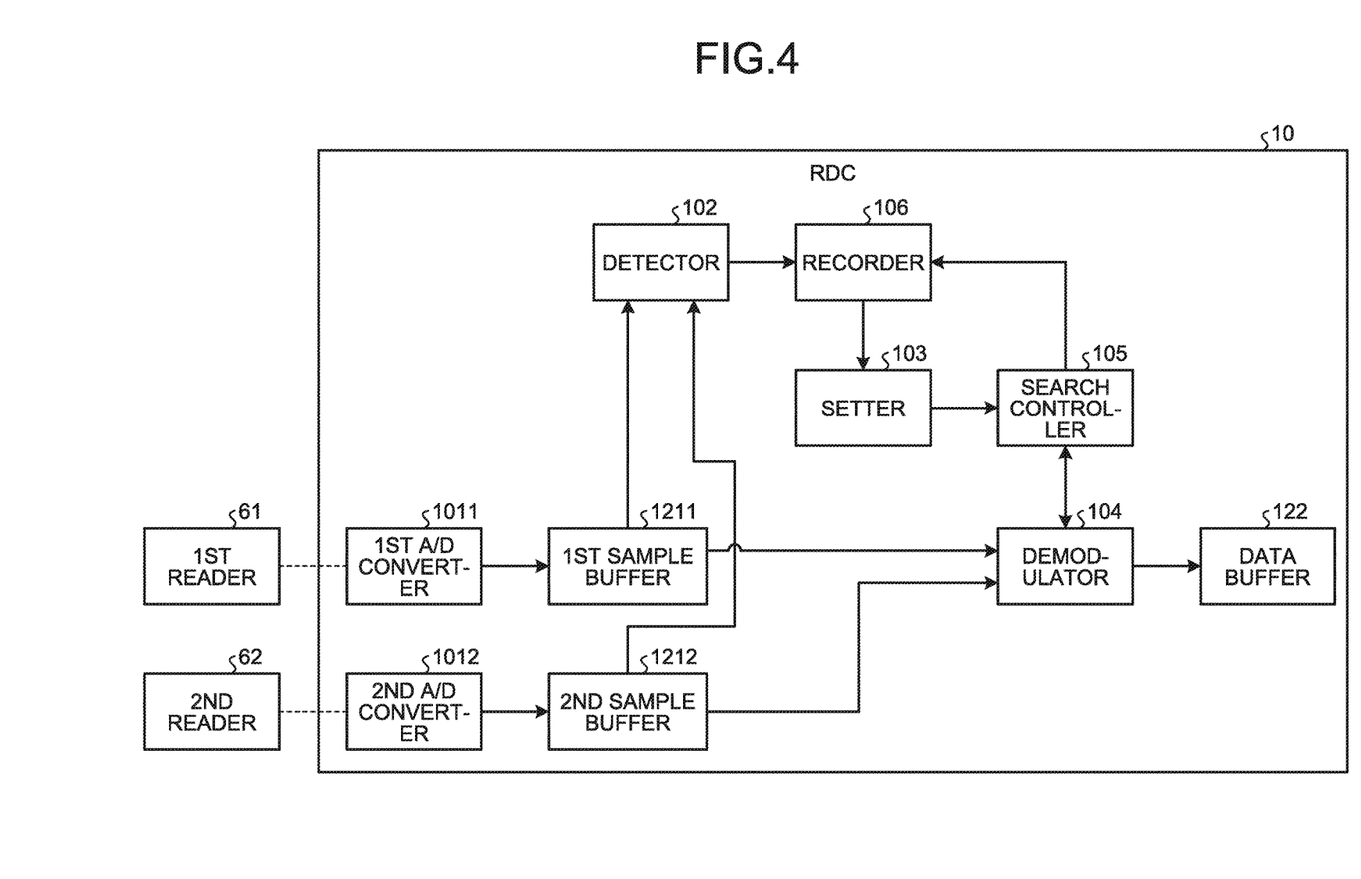
FIG. 4 is a functional configuration diagram of an RDC in a magnetic disk device of a second embodiment.

FIG. 4 is a functional configuration diagram of an RDC 10 in a magnetic disk device 1 of the second embodiment. The RDC 10 of FIG. 4 differs from that of FIG. 2 in including a first A/D converter 1011 for the first reader 61 and a second A/D converter 1012 for the second reader 62, instead of the A/D converter 101.

Further, the RDC 10 of FIG. 4 includes a first sample buffer 1211 and a second sample buffer 1212 instead of the sample buffer 121 of FIG. 2. A signal read by the first reader 61 is stored in the first sample buffer 1211 through the preamp 9 and the first A/D converter 1011, together with an indication that the signal has been read by the first reader 61.

Likewise, a signal read by the second reader 62 is stored in the second sample buffer 1212 through the preamp 9 and the second A/D converter 1012, together with an indication that the signal has been read by the second reader 62.

The detector 102 detects sync marks assigned to respective items of user data from the signal (buffered data) stored in the first sample buffer 1211. Further, the detector 102 detects sync marks assigned to respective items of user data from the signal (buffered data) stored in the second sample buffer 1212.

In the following, description will be made of an example of detection of a sync mark from data read by the first reader 61 but no detection of a sync mark from data read by the second reader 62. In this case, the setter 103 sets the search start position of data of interest for a forced search of the data read by the second reader 62 on the basis of positional information on the sync mark detected by the detector 102 from the data read by the first reader 61.

Figure 5:
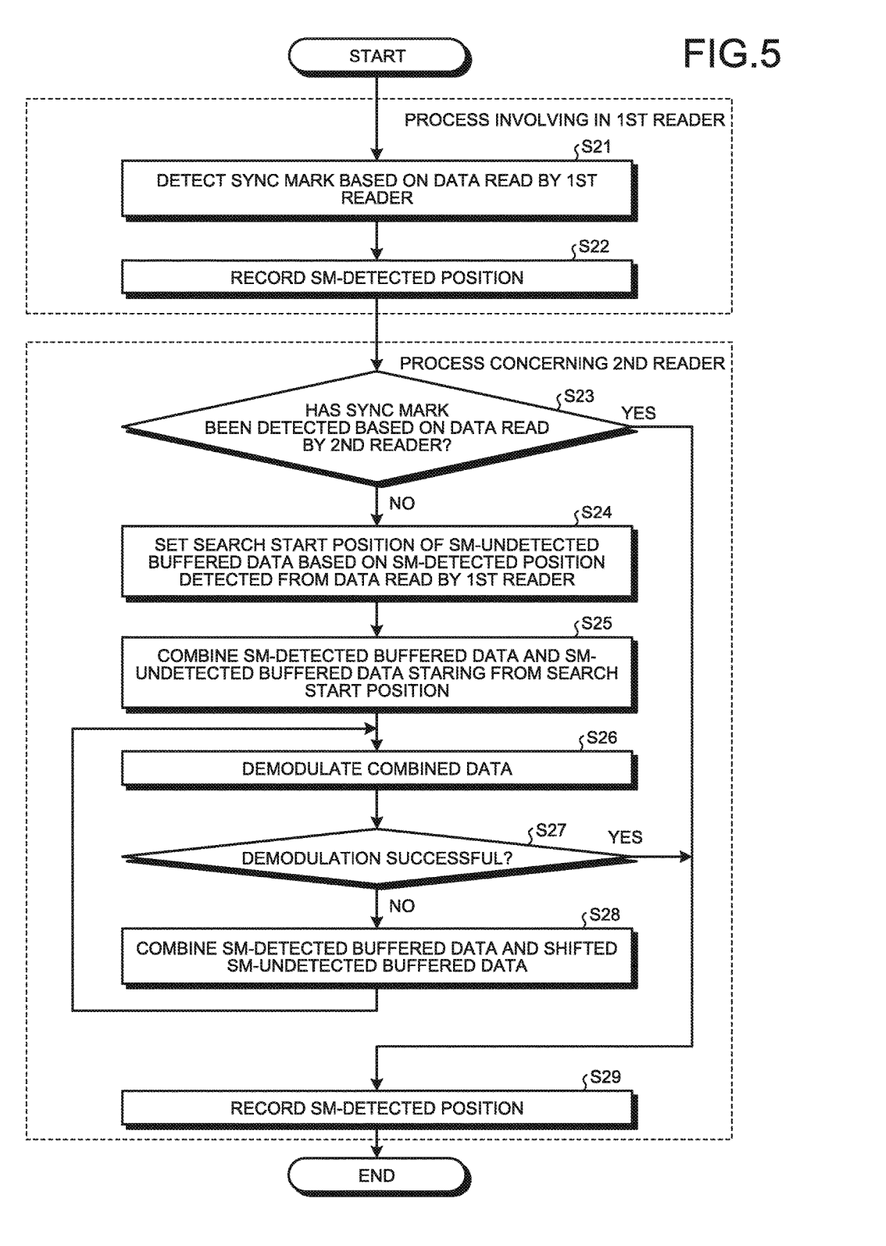
FIG. 5 is a flowchart illustrating the process by the magnetic disk device of the second embodiment.

Next, the process by the magnetic disk device 1 of the second embodiment will be described with reference to FIG. 5. FIG. 5 is a flowchart illustrating the process by the magnetic disk device 1 of the second embodiment. Steps S21, S22 concern the processing involving in the first reader 61, and steps S23 to S29 concern the processing involving in the second reader 62.

At step S21, the detector 102 detects a sync mark from data read by the first reader 61 from the first sample buffer 1211.

At step S22, the recorder 106 records the position (SM-detected position) of the sync mark detected by the detector 102.

At step S23, the detector 102 determines whether a sync mark has been detected from data read by the second reader 62 from the second sample buffer 1212. If YES, the process proceeds to step S29, and if NO, the process proceeds to step S24.

At step S24, the setter 103 sets a forced-search start position of SM-undetected buffered data based on the SM-detected position detected from the data read by the first reader 61. A search range may also be set.

At step S25, the demodulator 104 combines the SM-detected buffered data and the SM-undetected buffered data starting from the forced-search start position.

At step S26, the demodulator 104 demodulates the combined data. At step S27, the demodulator 104 determines whether the demodulation has succeeded. If YES, the process proceeds to step S29, and if NO, the process proceeds to step S28.

At step S28, the demodulator 104 combines the SM-detected buffered data and shifted SM-undetected buffered data, and the process returns to step S26. At step S29, the recorder 106 records the SM-detected position, completing the process.

Thus, the magnetic disk device 1 of the second embodiment uses the position of the sync mark detected by the detector 102 from the data read by the first reader 61 as the forced-search start position of data of interest read by the other reader, which can reduce the number of times at which data of interest is shifted in the forced search and shorten the processing time, compared with no such operation. It is particularly useful for high-density recording technology which adopts a large number of readers.

Third Embodiment

Figure 6:
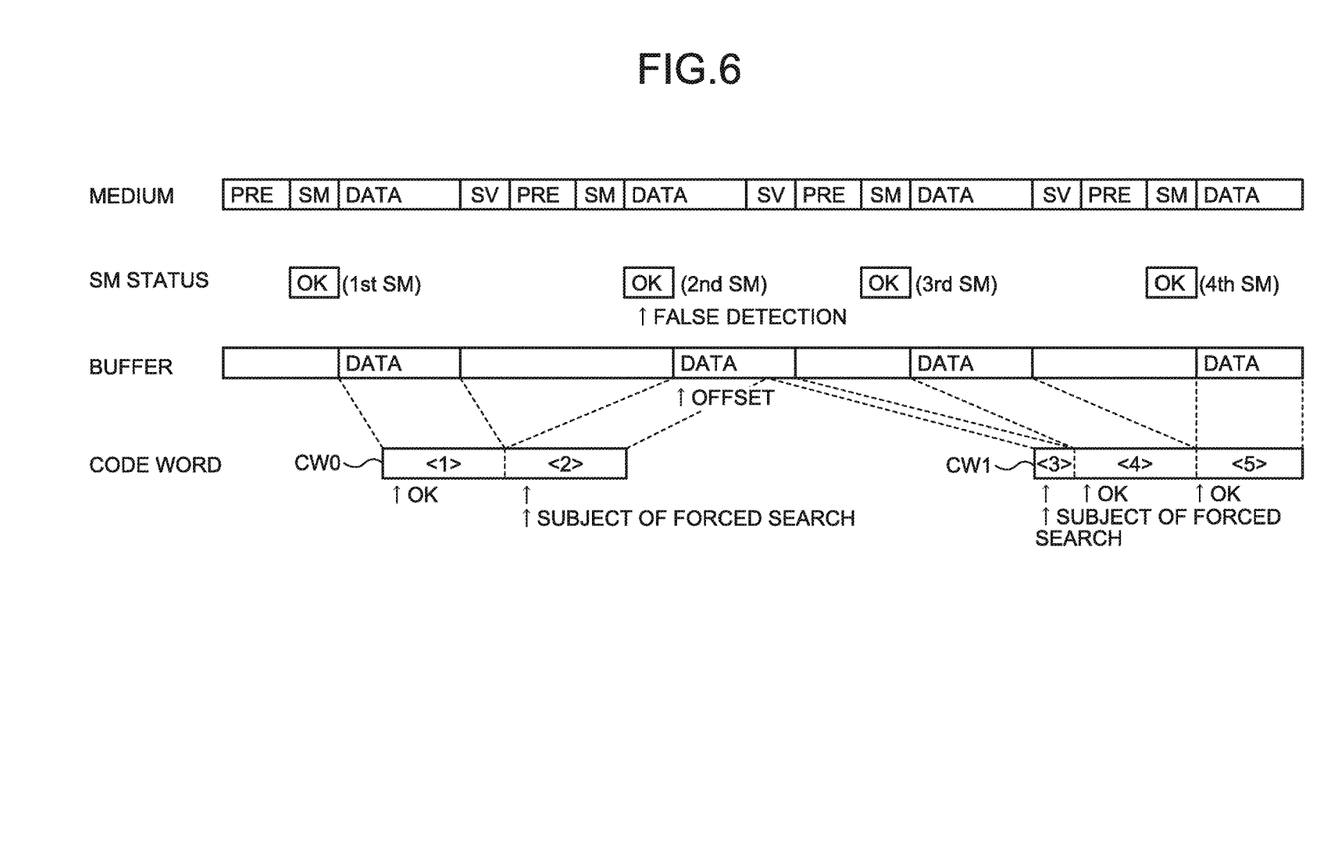
FIG. 6 is an explanatory diagram of false detection of a sync mark in a third embodiment.

Next, a third embodiment of the present invention will be described. FIG. 6 is an explanatory diagram of an exemplary false detection of a sync mark in the third embodiment. In the example of FIG. 6, the 2nd SM is falsely detected. That is, the 2nd SM is detected, however, its detected position is false. In this case, detection of the SM is recognized in spite of the false detection of the position, so that a sync mark error is not recognized.

In this case, the demodulator 104 fails in demodulating CW0 because of the false position of DATA<2> in the buffer, although the position of DATA<1> is correct. Likewise, the demodulator 104 fails in demodulating CW1 because the positions of DATA<4> and DATA<5> are correct but the position of DATA<3> is false in the buffer.

In this case, in the comparative example (conventional technique), all the sync marks corresponding to the unsuccessfully-demodulated CW0 and CW1 are subjected to the forced search, which may result in elongating the processing time.

Figure 7:
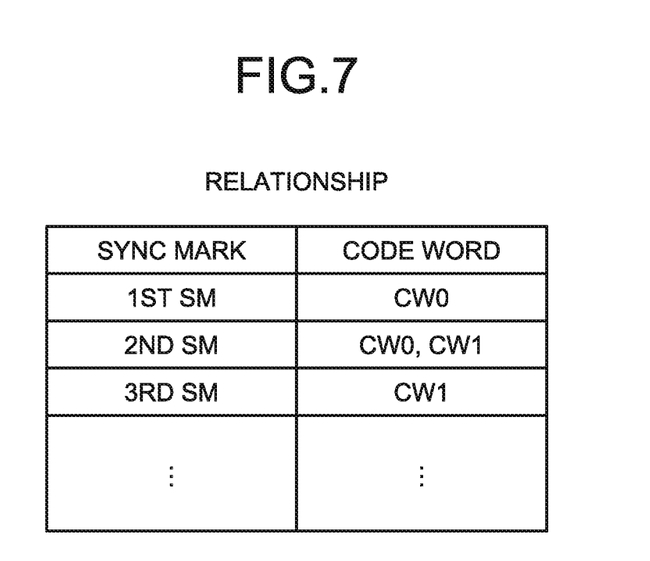
FIG. 7 is a diagram illustrating a relationship stored in the magnetic disk device of the third embodiment.

In contrast, the magnetic disk device 1 of the present embodiment deals with the false detection as follows. FIG. 7 is a diagram illustrating a relationship between sync marks and code words stored in the storage unit (relationship storage) 12 of the magnetic disk device 1 of the third embodiment. Specifically, the code word CW0 is associated with the sync mark "1st SM" (first sync mark) The code words CW0, CW1 are associated with the sync mark "2nd SM" (second sync mark). The code word CW1 is associated with the sync mark "3rd SM" (third sync mark).

If the demodulator 104 fails in the demodulation despite no sync marks not detected by the detector 102, the search controller 105 (FIG. 2) performs a forced search for the sync mark corresponding to an unsuccessfully-demodulated code word, referring to the relationship (FIG. 7) in the storage unit 12.

Referring to the relationship, the search controller 105 can identify the 1st SM as the sync mark to be forcedly searched for, for example, when the code word of which the demodulation has failed is CW0 alone. When CW0 and CW1 are code words of which the demodulation has failed, the search controller 105 can identify the 2nd SM as the sync mark to be forcedly searched for. When the code word of which the demodulation has failed is CW1 alone, the search controller 105 can identify the 3rd SM as the sync mark to be forcedly searched for.

As described above, the magnetic disk device 1 of the third embodiment can identify sync marks which need to be subjected to the forced search from among all the sync marks corresponding to the code words of which the demodulation has failed, therefore, can reduce the number of forced searches and can shorten the processing time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above embodiments have described the sample buffer 121 and the data buffer 122 incorporated in the RDC 10 (FIG. 2), however, the buffers may be incorporated in the storage unit 12 (FIG. 1) instead of the RDC 10.

Further, the programs executed in the magnetic disk device 1 of the embodiments can be recorded and provided in installable or executable file format on a computer-readable recording medium such as a compact disc (CD), a read only memory (ROM), a flexible disk (FD), a CD-R (recordable), or a digital versatile disk (DVD). The programs executed in the magnetic disk device 1 of the embodiments may be provided or distributed via a network such as the Internet.

What is claimed is:

1. A storage device comprising:
    a detector that detects a sync mark, assigned to each of user data items, from buffered data read from a recording medium;
    a demodulator that demodulates the user data items of the buffered data in unit of code word having a given size;
    a controller that sets a start position of data of interest for forced search, the data of interest being part of each user data item of the buffered data, starting from the start position, and that, when the user item is split data including first data being at least part of a first code word and second data being at least part of a second code word, and when the detector has not detected the sync mark corresponding to the user data item, controls, in the forced search of the user data item, the demodulator to demodulate the first code word such that the data of interest of the first data is repeatedly demodulated until successfully demodulated while the start position is shifted; and
    a recorder that records a position of the sync mark when the controller has succeeded in the forced search, wherein
    the controller sets the start position of the second data for the forced search of the second code word on the basis of the position of the sync mark recorded by the recorder when the controller has succeeded in the forced search of the first code word.

2. The storage device according to claim 1, wherein
    the controller sets the start position of the data of interest for the forced search on the basis of positional information on the sync mark detected by the detector.

3. The storage device according to claim 2, wherein
    when no positional information on the sync mark detected by the detector is available, the controller sets the start position of the data of interest for the forced search by a given algorithm.

4. The storage device according to claim 1, wherein
    the demodulator demodulates the user data items of the buffered data on a code-word basis using a function of at least one of a Viterbi decoder, a low-density parity-check decoder, and a run-length-limited decoder.

5. The storage device according to claim 1, further comprising a read channel in which the detector, the demodulator, the controller, and the recorder are provided.

6. The storage device according to claim 1, further comprising a head provided with a plurality of readers, the head that reads information from the recording medium, wherein
    the detector detects a sync mark from data read by each of the readers, and
    the controller updates, on the basis of positional information on the sync mark detected by the detector from the data read by one of the readers, the start position of the data of interest for the forced search of the data read by another one of the readers.

7. The storage device according to claim 6, wherein
    the controller sets the position of the sync mark detected by the detector from the data read by the one of the readers as the start position of the data of interest for the forced search of the data read by another one of the readers.

8. The storage device according to claim 6, wherein
    the readers read same information from the recording medium to increase information reading accuracy.

9. The storage device according to claim 1, further comprising
    a relationship storage that stores a relationship between the sync marks and the code words, wherein
    when the demodulator fails in the demodulation in spite of no sync mark not detected by the detector, the controller performs forced search for the sync mark corresponding to a code word of which the demodulation has failed, referring to the relationship stored in the relationship storage.

10. The storage device according to claim 9, wherein
    the relationship includes the first code word associated with a first sync mark, the first and second code words associated with a second sync mark, and the second code word associated with a third sync mark; and
    when the demodulator fails in the demodulation in spite of no sync mark not detected by the detector, and when the controller performs forced search for the sync mark corresponding to a code word of which the demodulation has failed, referring to the relationship in the relationship storage,
    the controller
        performs the forced search for the first sync mark when the code word of which demodulation has failed is the first code word alone,
        performs the forced search for the second sync mark when the code word of which the demodulation has failed is the first and second code words, and
        performs the forced search for the third sync mark when the code word of which demodulation has failed is the second code word alone.

11. A control method of a recording medium that magnetically records information in a storage device, the control method comprising:

detecting a sync mark, assigned to each of user data items, from buffered data read from a recording medium;

demodulating the user data items of the buffered data in unit of code word having a given size;

setting a start position of data of interest for forced search, the data of interest being part of each user data item of the buffered data, starting from the start position;

when a user data item is split data including first data being at least part of a first code word and second data being at least part of a second code word, and when having not detected the sync mark corresponding to the user data item, demodulating the first code word in the forced search of the user data item such that the data of interest of the first data is repeatedly demodulated until successfully demodulated while the start position is shifted;

recording a position of the sync mark when the forced search has succeeded; and setting the start position of the second data for the forced search of the second code word on the basis of the position of the sync mark recorded when the forced search of the first code word has succeeded.

12. The control method according to claim 11, further comprising setting the start position of the data of interest for the forced search on the basis of positional information on the sync mark.

13. The storage device according to claim 12, further comprising setting the start position of the data of interest for the forced search by a given algorithm when no positional information on the sync mark is available.

14. The control method according to claim 11, further comprising demodulating the user data items of the buffered data on a code-word basis using a function of at least one of a Viterbi decoder, a low-density parity-check decoder, and a run-length-limited decoder.

15. The control method according to claim 11, wherein the method is executed by a read channel.

16. The control method according to claim 11, wherein the storage device includes a head provided with a plurality of readers, the head that reads information from the recording medium, the method further comprising detecting a sync mark from data read by each of the readers, and updating, on the basis of positional information on a sync mark detected from the data read by one of the readers, the start position of the data of interest for the forced search of the data read by another one of the readers.

17. The control method according to claim 16, further comprising setting the position of the sync mark detected from the data read by the one of the readers as the start position of the data of interest for the forced search of the data read by another one of the readers.

18. The control method according to claim 16, wherein the readers read same information from the recording medium to increase reading information accuracy.

19. The control method according to claim 11, wherein the storage device comprises a relationship storage that stores a relationship between the sync marks and the code words, the method further comprising when the demodulation has failed in spite of no sync mark not detected, forcedly searching for the sync mark corresponding to a code word of which the demodulation has failed, referring to the relationship stored in the relationship storage.

20. The control method according to claim 19, wherein the relationship includes the first code word associated with a first sync mark, the first and second code words associated with a second sync mark, and the second code word associated with a third sync mark, the method further comprising when the demodulation fails in spite of no sync mark not detected, and when forcedly searching for the sync mark corresponding to a code word of which the demodulation has failed, referring to the relationship in the relationship storage, forcedly searching for the first sync mark when the code word of which demodulation has failed is the first code word alone, forcedly searching for the second sync mark when the code word of which demodulation has failed is the first and second code words, and forcedly searching for the third sync mark when the code word of which demodulation has failed is the second code word alone.

* * * * *